(12) United States Patent
Kuwahara et al.

(10) Patent No.: US 11,396,097 B2
(45) Date of Patent: Jul. 26, 2022

(54) TEACHING APPARATUS, ROBOT SYSTEM, AND TEACHING METHOD

(71) Applicant: Kabushiki Kaisha Yaskawa Denki, Kitakyushu (JP)

(72) Inventors: Koichi Kuwahara, Kitakyushu (JP); Yoshifumi Onoyama, Kitakyushu (JP); Kazuma Tabuchi, Kitakyushu (JP); Masaru Adachi, Kitakyushu (JP); Wataru Watanabe, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 284 days.

(21) Appl. No.: 16/183,749

(22) Filed: Nov. 8, 2018

(65) Prior Publication Data
US 2019/0143514 A1    May 16, 2019

(30) Foreign Application Priority Data

Nov. 10, 2017   (JP) .............................. JP2017-217742

(51) Int. Cl.
*B25J 9/16* (2006.01)
*B25J 15/00* (2006.01)

(52) U.S. Cl.
CPC ........... *B25J 9/1664* (2013.01); *B25J 9/1628* (2013.01); *B25J 9/1666* (2013.01); *B25J 15/0019* (2013.01); *G05B 2219/36407* (2013.01); *G05B 2219/36412* (2013.01); *G05B 2219/37071* (2013.01); *G05B 2219/37217* (2013.01);
(Continued)

(58) Field of Classification Search
CPC ...... B25J 9/1664; B25J 9/1628; B25J 9/1666; B25J 15/0019; G05B 2219/36407; G05B 2219/36412; G05B 2219/37071; G05B 2219/37217; G05B 2219/37441; G05B 2219/45104
See application file for complete search history.

(56) References Cited

U.S. PATENT DOCUMENTS

2006/0099553 A1   5/2006   Joo et al.
2009/0281662 A1*  11/2009  Ueyama ................. G05B 17/02
                                                              700/259
(Continued)

FOREIGN PATENT DOCUMENTS

| CN | 106056648 A | * | 10/2016 | ............... G06K 9/38 |
| JP | 2004243461 A | * | 9/2004 | ............... B25J 9/22 |
| JP | 2005524088 A |   | 8/2005 | |

(Continued)

OTHER PUBLICATIONS

Machine Translation of JP2004243461A, Apr. 2009, Shingo Ando (Year: 2009).*

(Continued)

*Primary Examiner* — Jeff A Burke
*Assistant Examiner* — Mohamad O El Sayah
(74) *Attorney, Agent, or Firm* — HEA Law PLLC (57) ABSTRACT

A teaching apparatus includes circuitry. The circuitry is configured to obtain result information corresponding to a position of a worked region on a workpiece. The circuitry is configured to generate first teaching information based on the result information. The first teaching information specifies a motion of an examination robot configured to examine the workpiece that has undergone work.

15 Claims, 10 Drawing Sheets

(52) U.S. Cl.
CPC .............. *G05B 2219/37441* (2013.01); *G05B 2219/45104* (2013.01)

(56) References Cited

U.S. PATENT DOCUMENTS

2018/0370027 A1* 12/2018 Oota ..................... B25J 9/1612
2019/0120771 A1*  4/2019 Oota ....................... G01N 1/34

FOREIGN PATENT DOCUMENTS

| JP | 2010019776 A |   | 1/2010 |              |
|----|--------------|---|--------|--------------|
| JP | 2012139725 A |   | 7/2012 |              |
| KR | 20150015782 A | * | 2/2015 | ............. B23K 9/127 |

OTHER PUBLICATIONS

Machine Translation of KR20150015782A, Feb. 2015, Sang-Eun Park (Year: 2015).*
Machine translation of CN-106056648-A (Year: 2016).*
Office Action of Jun. 22, 2021, for corresponding of JP Patent Application No. 2017-217742 with English translation pp. 1-11.
Office Action dated Jul. 5, 2021, for corresponding CN Patent Application No. 2021063002735480 with English translation pp. 1-14. (Supplemental concise explanation of relevance for KR20150015782A listed on Office Action dated Aug. 16, 2021).
Office Action dated Jan. 4, 2022, for corresponding JP Patent Application No. 2017-217742 with English translation pp. 1-18.

* cited by examiner

|   | P1  | P2  | P3  | P4  |
|---|-----|-----|-----|-----|
| P1|     | 0.4 | 1.0 | 0.4 |
| P2| 0.3 |     | 0.1 | 0.8 |
| P3| 1.0 | 0.3 |     | 0.2 |
| P4| 0.1 | 1.4 | 1.2 |     |

# TEACHING APPARATUS, ROBOT SYSTEM, AND TEACHING METHOD

CROSS-REFERENCE TO RELATED APPLICATIONS

The present application claims priority under 35 U.S.C. § 119 to Japanese Patent Application No. 2017-217742, filed Nov. 10, 2017. The contents of this application are incorporated herein by reference in their entirety.

BACKGROUND

Field of the Invention

The embodiments disclosed herein relate to a teaching apparatus, a robot system, and a teaching method.

Discussion of the Background

Some robots known in the art make a motion by driving a plurality of joints. At the leading end of the robot, an end effector is mounted. The end effector varies depending on the application in which the robot is used, such as welding and holding, so that the robot is capable of performing various kinds of work such as machining and moving of workpieces.

JP 5-087539A discloses an examination method that includes: radiating light to a machined workpiece to measure a machined part of the workpiece; and examining the machined part based on the result of measurement.

SUMMARY

According to one aspect of the present disclosure, a teaching apparatus includes circuitry. The circuitry is configured to obtain result information corresponding to a position of a worked region on a workpiece. The circuitry is configured to generate first teaching information based on the result information. The first teaching information specifies a motion of an examination robot configured to examine the workpiece that has undergone work.

According to another aspect of the present disclosure, a robot system includes an examination robot and a robot controller. The examination robot is configured to examine a workpiece that has undergone work. The robot controller is configured to control a motion of the examination robot based on the first teaching information generated by the above-described teaching apparatus.

According to the other aspect of the present disclosure, a teaching method includes obtaining result information corresponding to a position of a worked region on a workpiece. Based on the result information obtained in the obtaining step, first teaching information is generated. The first teaching information specifies a motion of an examination robot configured to examine the workpiece that has undergone work.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

By retelling to the accompanying drawings, teaching apparatus, a robot system, and a teaching method according to embodiments will be described in detail below. It is noted that the following embodiments are provided for example purposes only and are not intended for limiting purposes.

Also in the following description, terms such as "orthogonal", "perpendicular", "parallel", and "vertical" may not necessarily be used in a strict sense. That is, these terms are used with production-related and installation-related tolerances and errors taken into consideration.

Figure 1:
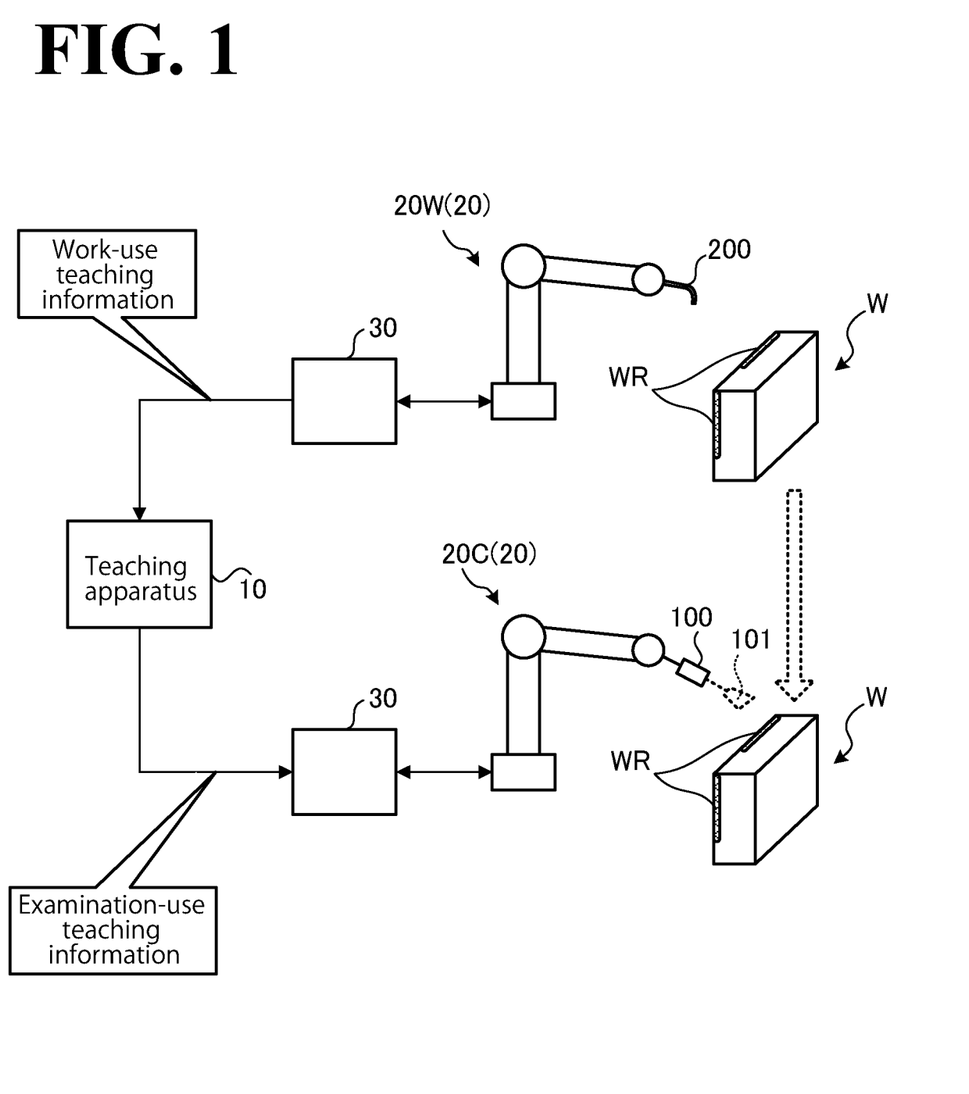
FIG. 1 outlines a teaching method according to an embodiment.

A teaching method according to this embodiment will be outlined by referring to FIG. 1. FIG. 1 outlines the teaching method according to this embodiment. In the following description, welding work is performed as an example of work performed on a workpiece W, and a welding trace (bead trace) left as a result of welding work is examined. Another possible example of the work performed on the workpiece W is to change roughness of the surface of the workpiece W. Still another possible example of the work is to form a groove on the workpiece W. Still another possible example of the work is to draw a picture on the workpiece W.

As illustrated in FIG. 1, one robot 20 is denoted 20W. This robot is a work robot 20W feat is attached with a work tool 200 and that performs work on a work region WR of the workpiece W using the work tool 200. Since the work robot 20W according to this embodiment performs welding work, the work tool 200 is a welding torch. Another robot 20 is denoted 20C. This robot is an examination robot 20C that is attached wife an examination device 100 and that examines the work region WR of a workpiece W that has undergone the work. Also as illustrated in FIG. 1, the broken-line arrow located between two workpieces W indicates a direction in which one workpiece W can be moved manually, for example.

The examination device 100 of the examination robot 20C obtains a three-dimensional shape of the work region WR by, for example, radiating light to the work region WR and moving the light while picking up an image of the light. Then, the examination device 100 determines whether the three-dimensional shape indicates a normal work result. For reference purposes, an examinable range 101 is indicated by broken lines in FIG. 1. The examinable range 101 is a range in which the examination device 100 is able to examine the work region WR.
}

The examinable range 101 corresponds to the range of vision conceivable by the examination device 100. Alternatively, the examinable range 101 may include the range of vision conceivable by the examination device 100 and the range of depth conceivable by the examination device 100. The examination robot 20C makes a motion such that the work region WR on the workpiece W is included in the examinable range 101.

In the embodiment of FIG. 1, the examination robot 20C and the work robot 20W are the same type of robots 20, and the same type of robot controllers 30 are used to control motions of the examination robot 20C and the work robot 20W. This configuration, however, is not intended in a limiting sense. Another possible embodiment is that the examination robot 20C and the work robot 20W are different types of robots, and the robot controllers 30 are different types of robot controllers.

As illustrated in FIG. 1, in the teaching method according to this embodiment, a teaching apparatus 10 obtains "second teaching information" (for example, work-use teaching information) from the robot controller 30 that controls motions of the work robot 20W. The second teaching information is teaching information that specifies motions of the work robot 20W.

Specifically, the teaching information is prepared in the teaching stage, in which the robot 20 is taught a motion, and includes "jobs" that constitute a program defining a motion path of the robot 20. That is, the second teaching information is information including jobs that constitute a program defining a motion path of the work robot 20W.

The teaching apparatus 10 also generates "first teaching information" (for example, examination-use teaching information) based on the obtained second teaching information. The first teaching information specifies motions of the examination robot 20C. Specifically, the first teaching information is information including jobs that constitute a program defining a motion path of the examination robot 20C. The robot controller 30 that controls motions of the examination robot 20C performs motion control of the examination robot 20C based on the first teaching information received from the teaching apparatus 10.

Thus, in the teaching method according to the embodiment, first teaching information is automatically generated based on second teaching information. This reduces the work load of teaching the examination robot 20C.

In the embodiment of FIG. 1, first teaching information is automatically generated based on second teaching information. Second teaching information, however, is not intended as limiting the information used to generate first teaching information. It is possible to generate first teaching information based on any of other information insofar as this information corresponds to the position of the worked region (work region WR) on the workpiece W (this information will be hereinafter referred to as "result information").

Specifically, in the case where second teaching information is used as result information, the work region WR is obtained indirectly from the motion path of the work robot 20W. In the case where shape information indicating a three-dimensional shape of the workpiece W including work regions WR on the workpiece W is directly obtainable, the shape information may be used as result information.

Figure 2A:
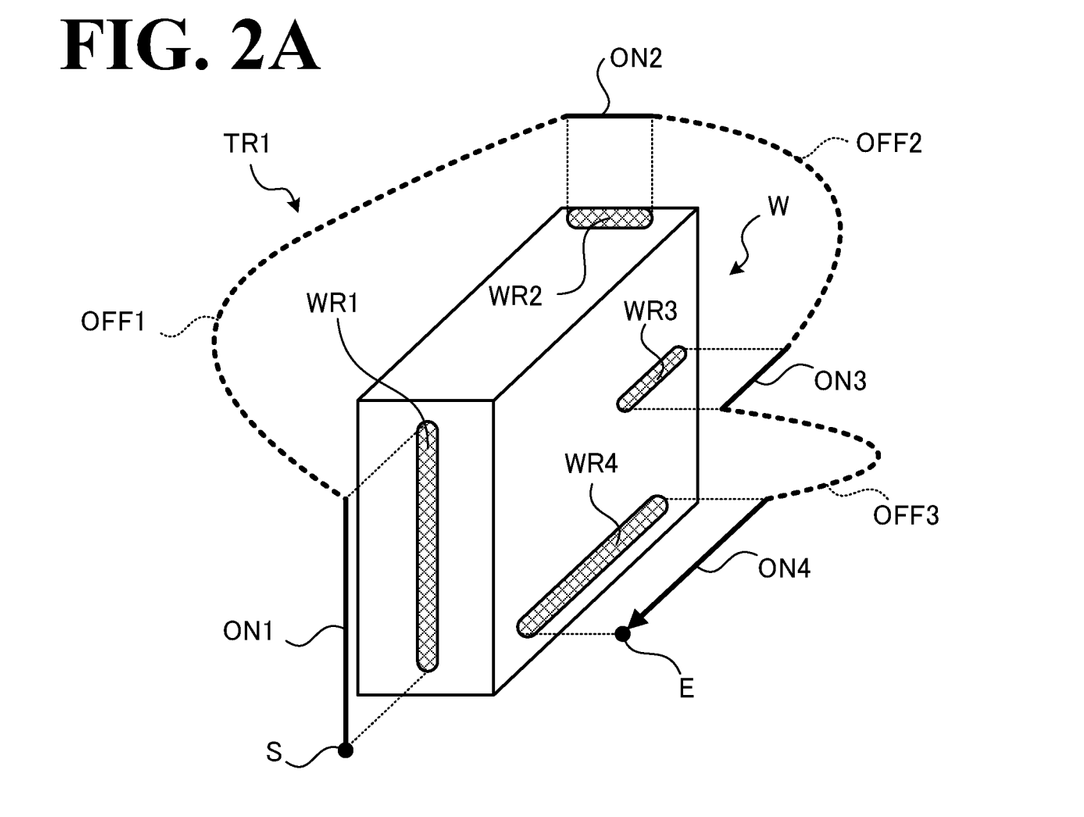
FIG. 2A is a first illustration of result information.
Figure 2B:
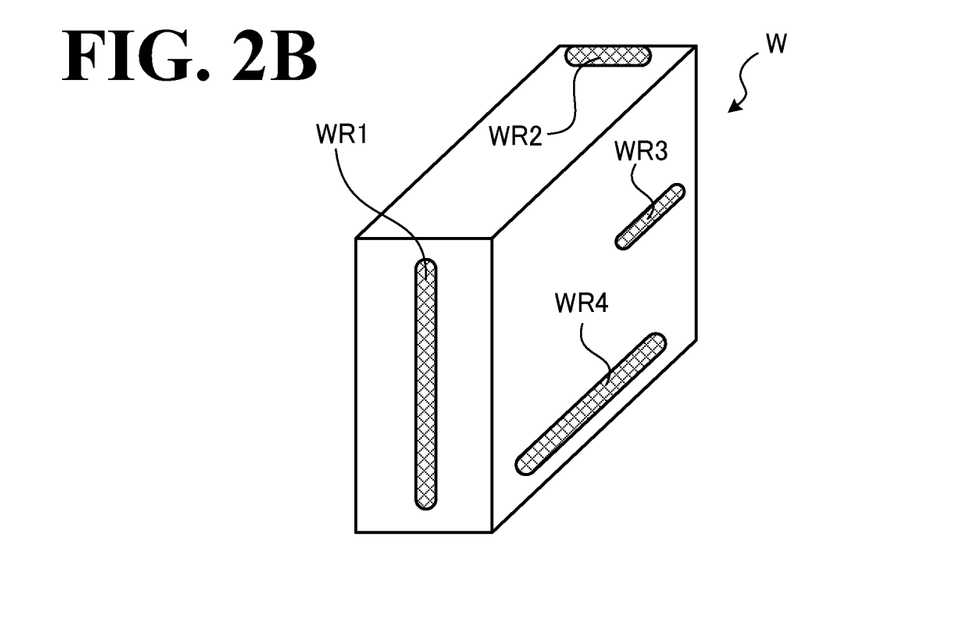
FIG. 2B is a second illustration of the result information.

In light of the circumstances, the following description is regarding: a case where second teaching information is used as result information, which will be described by referring to FIG. 2A; and a case where shape information is used as result information, which will be described by referring to FIG. 2B. FIG. 2A is a first illustration of result information, and FIG. 2B is a second illustration of result information.

First, a case where second teaching information is used as result information will be described. As illustrated in FIG. 2A, the second teaching information obtained by the teaching apparatus 10 (see FIG. 1) is information corresponding to the motion path, TR1, of the work robot 20W. The motion path (work path) TR1 is a path taken by a representative point set on the work robot 20W (an example representative point is the leading end of the work robot 20W).

The motion path TR1 continues from the start position, S, to the end position, E. The motion path TR1 includes sections ON and sections OFF. In the sections ON, the work tool 200 (see FIG. 1) is in ON state. In the sections OFF, the work tool 200 is in OFF state. Specifically, the work robot 20W performs welding work on the workpiece W during the periods of time corresponding to the sections ON.

In FIG. 2A, suffixes 1 to 4 are added to the end of "WR" of the work region WR on the workpiece W. The suffixes indicate the order in which the welding work proceeds. Similarly, suffixes 1 to 4 are added to the end of "ON" of the sections ON so that sections ON1 to ON4 respectively correspond to the work regions WR1 to WR4. Suffixes 1 to 3 are added to the end of "OFF" of the sections OFF (sections OFF1 to OFF3), the suffixes indicating the order in which the sections OFF are passed. Each of the work regions WR includes a three-dimensional shape such as a bead trace.

The teaching apparatus 10 (see FIG. 1) extracts the sections ON1 to ON4 from the motion path TR1 illustrated in FIG. 2A, and generates a motion path of the examination robot 20C based on the result of extraction. This will be described later by referring to FIG. 2C. Alternatively, the teaching apparatus 10 may extract the work regions WR1 to WR4 estimated from the distance between the motion path TR1 and the workpiece W, instead of extracting the sections ON1 to ON4, and generate a motion path of the examination robot 20C based on the result of extraction.

A case where shape information of the workpiece W is used as result information will be described by referring to FIG. 2B. As illustrated in FIG. 2B, the shape information obtained by the teaching apparatus 16 (see FIG. 1) is information including a three-dimensional shape of the workpiece W and the shape and position of the work region WR on the workpiece W. A specific example of the shape information is three-dimensional CAD (Computer Aided Design) data of the workpiece W including information indicating the shape and position of the work region WR. In FIG. 2B. the work regions WR have three-dimensional shapes, similarly to the work regions WR illustrated in FIG. 2A. The work regions WR, however, may be flat work regions WR having, for example, circular shapes or rectangular shapes. This will be described later by referring to FIG. 8.

The teaching apparatus 10 (see FIG. 1) generates a motion path of the examination robot 20C based on shape information of the workpiece W including the work regions WR. Specifically the teaching apparatus 10 generates a motion path of the examination robot 20C based on the shape of the examination device 100 (see FIG. 1) such that the work regions WR1 to WR4 are included in the examinable range 101 (see FIG. 1) of the examination device 100 of the examination robot 20C.

Figure 2C:
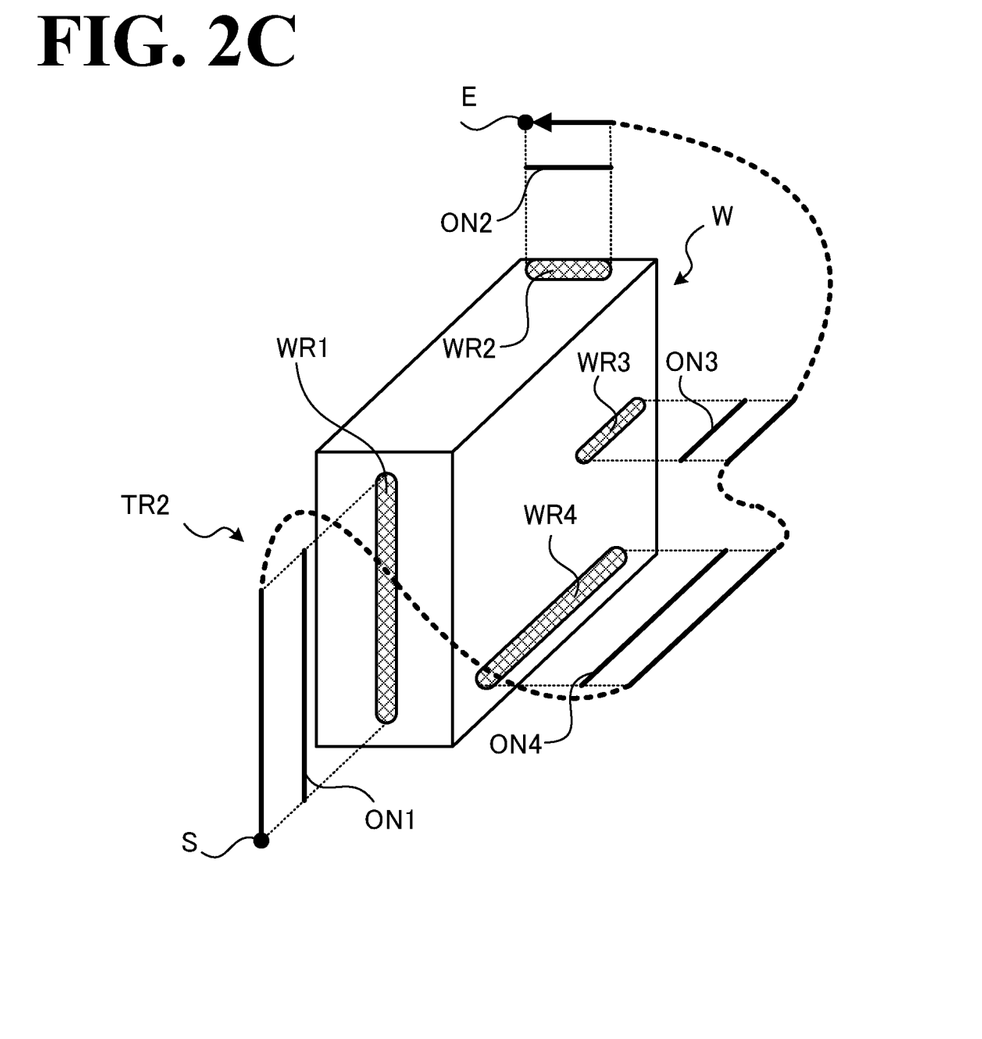
FIG. 2C illustrates an examination-use path.

By referring to FIG. 2C, description will be made with regard to the motion path, TR2, of the examination robot 20C generated by the teaching apparatus 10 (see FIG. 1) in the case where second teaching information is used as result information (see FIG. 2A). As illustrated in FIG. 2C, the teaching apparatus 10 calculates examination-use paths respectively corresponding to the sections ON1 to ON4 illustrated in FIG. 2A (see the solid-line sections of the motion path TR2).

As seen from FIG. 2C, the examination sections and the sections ON1 to ON4 do not overlap. This is because the examination device 100 illustrated in FIG. 1 and the work tool 200 are different from each other in shape. Based on the difference in shape, the teaching apparatus 10 generates examination-use paths such that the work regions WR1 to WR4 are included in the examinable range 101 (see FIG. 1).

Then, the teaching apparatus 10 (see FIG. 1) adds connect air-cut paths (see the broken-line sections of the motion path TR2) to the examination-use paths (see the solid-line sections of the motion path TR2), thereby completing the motion path TR2. As used herein, the air-cut path refers to a path through which the examination by the examination device 100 is stopped and the examination device 100 is prevented from contacting the workpiece W.

As illustrated in FIG. 2C, the air-cut paths may be different from the sections OFF1 to OFF3 illustrated in FIG. 2A. Also, the transit order in which the work regions WR1 to WR4 are taken along the motion path TR2 may be different from the transit order illustrated in FIG. 2A.

This is because a preferable order for performing work on the workpiece W may not necessarily be identical to a preferable order for examining the workpiece W. The processing of generating the motion path TR2 for the examination robot 20C will be described in detail later by referring to FIGS. 5A to 5D.

Figure 3:
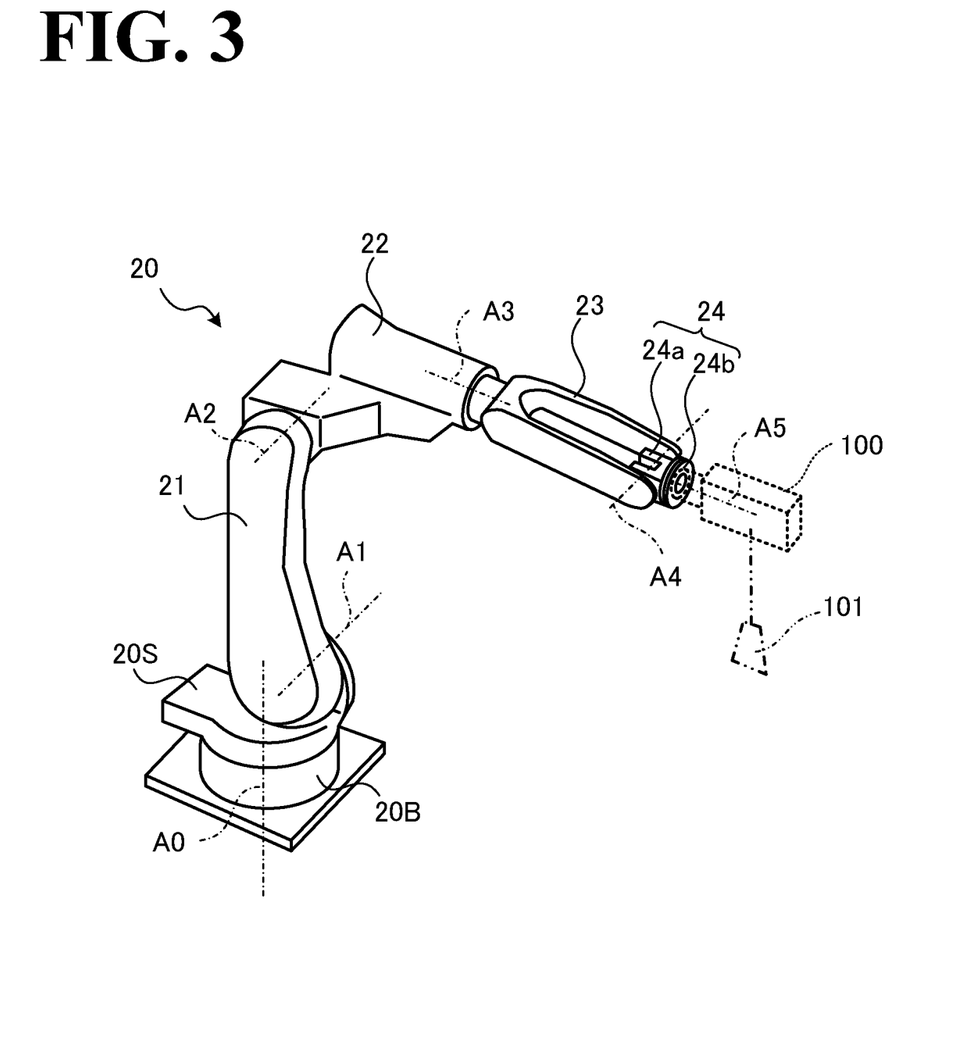
FIG. 3 is a side view of a configuration of a robot.

By referring to FIG. 3, description will be made with regard to a configuration of the robots 20, which are used as the work robot 20W and the examination robot 20C as illustrated in FIG. 1. For reference purposes, FIG. 3 illustrates the examination device 100 and its examinable range 101. The examination device 100 is used together with the examination robot 20C, which is one robot 20.

As illustrated in FIG. 3, the robot 20 is a "vertical multi-articular robot" having six axes, namely, vertical axis A0, first axis A1, second axis A2, third axis A3, fourth axis A4, and fifth axis A5. The robot 20 includes (in increasing order of distance from the base end) a base 20B, a turnable part 20S, a first arm 21, a second arm 22, a third arm 23, and a wrist 24.

The base 20B is fixed to an installation surface such as a floor. The turnable part 20S is supported by the base 20B and is turnable about the vertical axis A0, which is perpendicular to the installation surface. The first arm 21, at its base end, is supported by the turnable part 20S and is turnable about the first axis A1, which is perpendicular to the vertical axis A0. The second arm 22, at its base end, is supported by the leading end of the first arm 21 and is turnable about the second axis A2, which is parallel to the first axis A1.

The third arm 23, at its base end, is supported by the leading end of the second arm 22 and is turnable about the third axis A3, which is perpendicular to the second axis A2. The wrist 24 includes a base end 24a and a leading end 24b. The base end 24a, at its base end, is supported by the leading end of the third arm 23 and is turnable about the fourth axis A4, which is perpendicular to the third axis A3. The second arm 22, the third, arm 23, and the wrist 24 have hollow pails for cables and/or wires to pass through.

The leading end 24b, at its base end, is supported by the leading end of the base end 24a and is turnable about the fifth axis A5, winch is orthogonal to the fourth axis A4. The leading end 24b, at its leading end, is detachably attached with the examination device 100 and/or the work tool 200, such as a welding torch.

It will be understood by those skilled in the art that the robot 20 may have equal to or more than seven axes, or may have equal to or less than five axes. Also, the robot 20 used as the work robot 20W and the robot 20 used as the examination robot 20C may be different from each other in size and/or configuration. Also, the robot 20 may not necessarily be of floor type but may be of wall type or ceiling pendant type.

Figure 4:
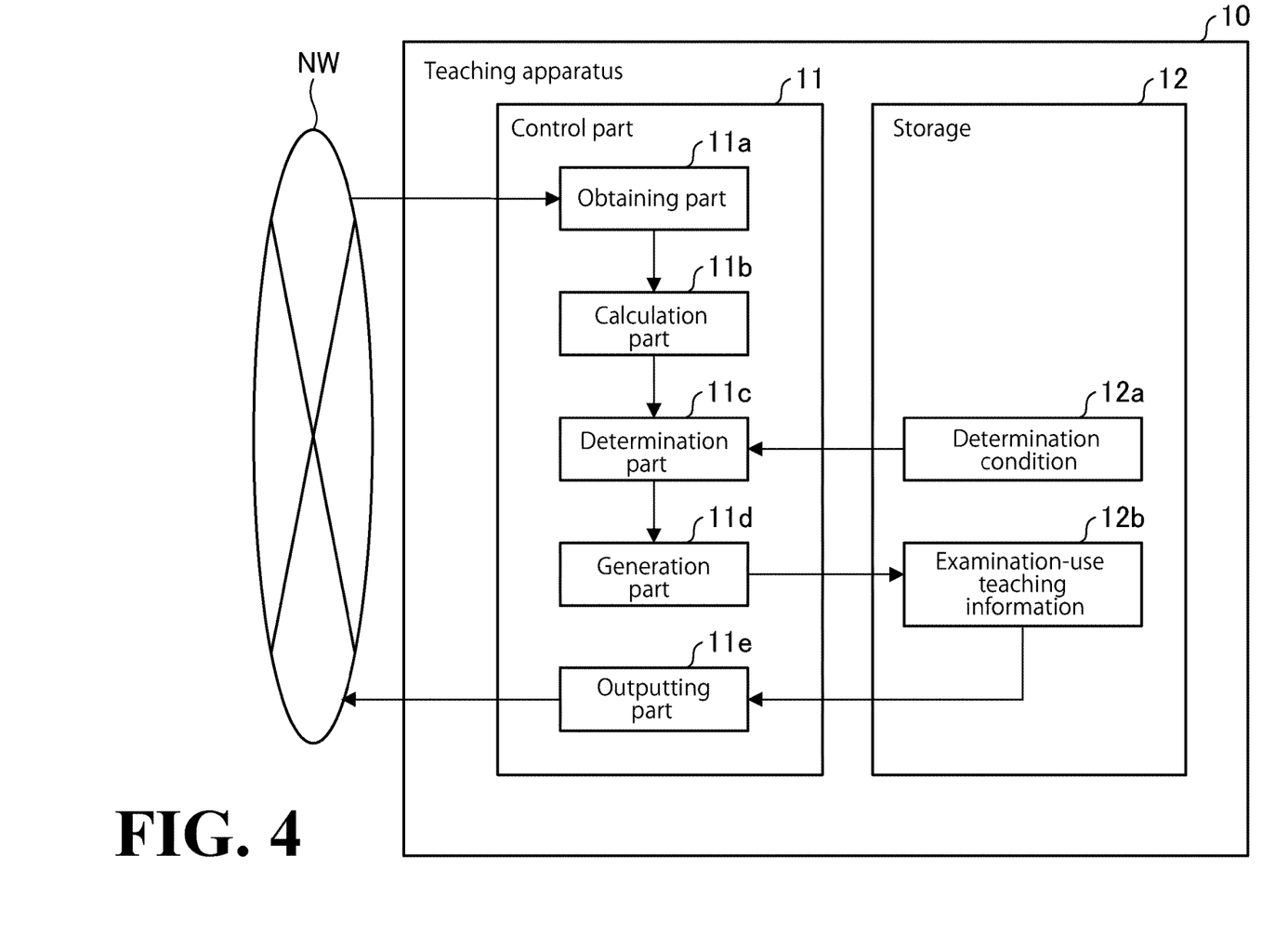
FIG. 4 is a block diagram illustrating a configuration of a teaching apparatus.

A configuration of the teaching apparatus 10 illustrated in FIG. 1 will be described by referring to FIG. 4. FIG. 4 is a block diagram illustrating a configuration of the teaching apparatus 10. The teaching apparatus 10 is connected to a wired or wireless communication network NW and thus is capable of transmitting and receiving various kinds of information. It will be understood by those skilled in the art that the teaching apparatus 10 may not necessarily be connected to the communication network NW but may be capable of exchanging information through a portable recording medium.

As illustrated in FIG. 4, the teaching apparatus 10 includes a control part 11 and a storage 12. The control part 11 includes an obtaining part 11a, a calculation part, 11b, a determination part 11c, a generation part 11d, and an outputting part 11e. The storage 12 stores a determination condition 12a and first teaching information 12b.

The teaching apparatus 10 includes a computer and various circuitry. The computer includes circuitry (central processing unit, CPU), a read only memory (ROM), a random access memory (RAM), a hard disk drive (HDD), and input-output ports.

The circuitry of the computer reads programs stored in the ROM and executes the programs to serve the functions of the obtaining part 11a, the calculation part 11b, the determination part 11c, the generation part 11d, and the outputting part 11e of the control part 11.

At least one or all of the obtaining part 11a, the calculation part 11b, the determination part 11c, the generation part 11d, and the outputting part 11e may be implemented by hardware such as ASIC (Application Specific Integrated Circuit) and FPGA (Field Programmable Gate Array).

The storage 12 corresponds to the RAM and or the HDD. The RAM and the HDD are capable of storing the determination condition 12a and the first teaching information 12b. It will be understood by those skilled in the art that the teaching apparatus 10 may obtain the above-described programs and various kinds of information from another computer connected to the teaching apparatus 10 through the wired or wireless communication network NW or from a portable recording medium.

The teaching apparatus 10 is capable of transmitting, through the communication network NW, the first teaching information 12b to the robot controllers 30, which is connected to the examination robot 20C illustrated in FIG. 1.

The control part 11 obtains the result information described above by referring to FIGS. 2A and 2B, and generates the first teaching information 12b based on the obtained result information. Also, the control part 11 controls the teaching apparatus 10 as a whole.

The obtaining part 11a obtains, through the communication network NW, result information corresponding to the position of the work region WR, which is a worked region of the workpiece W (see FIG. 1). Then, the obtaining part 11a outputs the obtained result information to the calculation part 11b.

Based on the result information received from the obtaining part 11a, the calculation part 11b calculates the plurality of examination-use paths described above by referring to FIG. 2C. Specifically, when the result information is second teaching information that specifies motions of the work robot 20W (see FIG. 1), the calculation part 11b calculates the examination-use paths based on the motion path TR1 (see FIG. 2A) included in the second teaching information.

When the result information is shape information including region information that indicates the work region WR on the workpiece W, the calculation part 11b calculates the examination-use paths based on three-dimensional information of the work region WR included in the shape information.

Based on the determination condition 12a stored in the storage 12, the determination part 11c determines the motion path TR2 (see FIG. 2C), with the plurality of examination-use paths calculated by the calculation part 11b being connected to each other. The determination condition 12a includes information concerning the shape of the examination device 100, and the motion path TR2 is determined so that an interference between the examination device 100 and the workpiece W or between the examination device 100 and an obstacle is avoided.

Examples of the determination condition 12a include, but are not limited to: the robot 20 passes the plurality of examination-use paths in a shortest period of time; the operation load on the mechanism(s) included in the robot 20 is minimized; and the torque load on the driving source of the robot 20, such as the motors and related elements, is minimized.

The generation part 11d generates the first teaching information 12b, which specifies motions of the examination robot 20C, based on the motion path TR2 (see FIG. 2C) determined by the determination part 11c. Then, the generation part 11d causes the storage 12 to store the generated first teaching information 12b. In response to, for example, an input operation performed by a worker, the outputting part 11e outputs the first teaching information 12b stored in the storage 12 to the robot controller 30 connected to the examination robot 20C.

By referring to FIGS. 5A to 5D, processing of determining the transit order of the examination-use paths performed by the teaching apparatus 10 will be detailed. FIGS. 5A to 5D are first to fourth illustrations of the processing of determining the transit order of the examination-use paths. The following description will refer to the elements of the teaching apparatus 10 illustrated in FIG. 4, along with their reference numerals. While in FIGS. 5A to 5D vectors and other signs are expressed two-dimensionally for simplicity reasons, three-dimensional expressions may be used in actual situations.

Figure 5A:
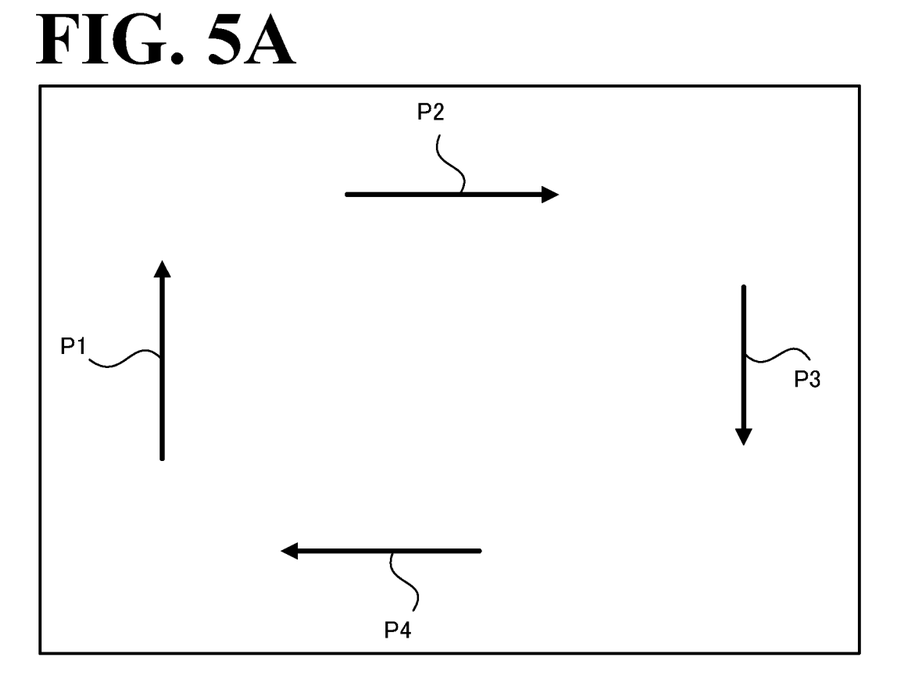
FIG. 5A is a first illustration of processing of determining a transit order in which examination-use paths are taken.

As illustrated in FIG. 5A, the calculation part 11b calculates examination-use paths P1 to P4 based on result information. The examination-use paths P1 to P4 respectively correspond to the work regions WR on the workpiece W. Specifically, the examination-use paths P1 to P4 respectively correspond to the work regions WR1 to WR4 illustrated in FIG. 2A and other drawings.

It is to be that the lengths of the examination-use paths P1 to P4 and the arrangement of the examination-use paths P1 to P4 are schematically illustrated in FIG. 5A and that FIG. 5A is not intended to illustrate actual lengths and actual path-to-path distances. Also in the following description, where it is not necessary to distinguish the examination-use paths P1 to P4 from each other, the examination-use paths P1 to P4 may occasionally be referred to as examination-use path P or examination-use paths P.

Also in the following description, the examination-use path P is described as a "vector", which includes direction, as illustrated in FIG. 5A. It is also possible, however, to use an examination-use path P without direction.

Figure 5B:
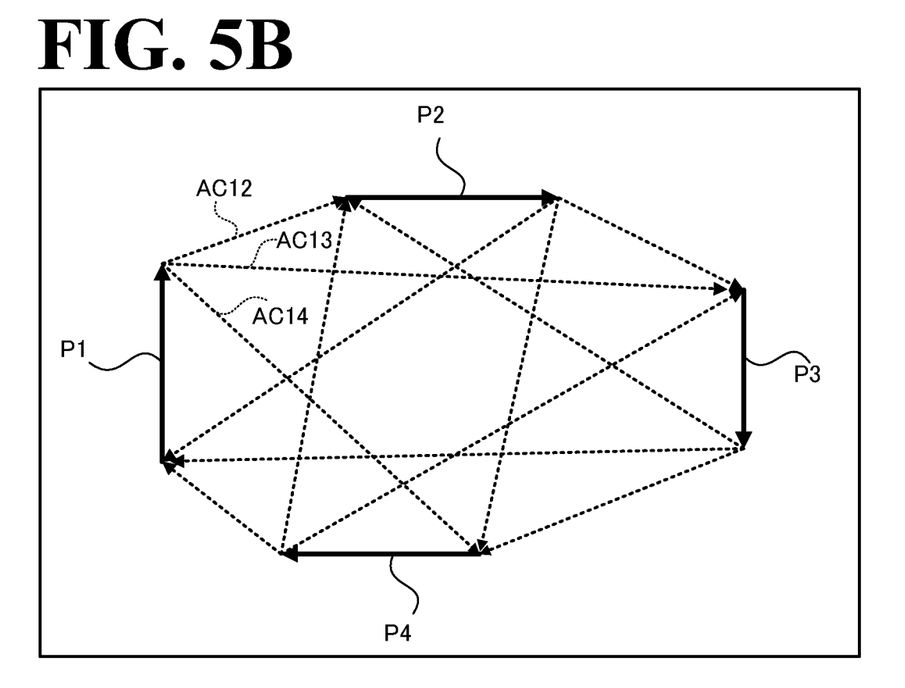
FIG. 5B is a second illustration of the processing of determining the transit order of the examination-use paths.

As illustrated in FIG. 5B, the determination part 11c generates a candidate path AC12, a candidate path AC13, and a candidate path AC14. The candidate path AC12 connects the end point of examination-use path P1 to the start point of examination-use path P2. The candidate path AC13 connects the end point of the examination-use path P1 to the start point of examination-use path P3. The candidate path AC14 connects the end point of the examination-use path P1 to the start point of examination-use path P4. Then, the determination part 11c repeats similar processing for the examination-use path P2, the examination-use path P3, and the examination-use path P4 (see broken lines in FIG. 5B).

Figure 5C:
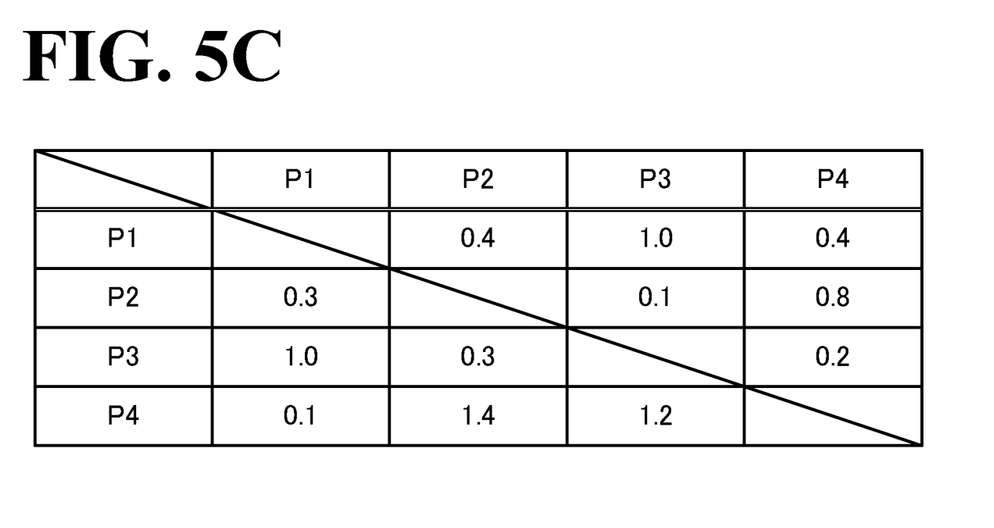
FIG. 5C is a third illustration of the processing of determining the transit order of the examination-use paths.
Figure 5D:
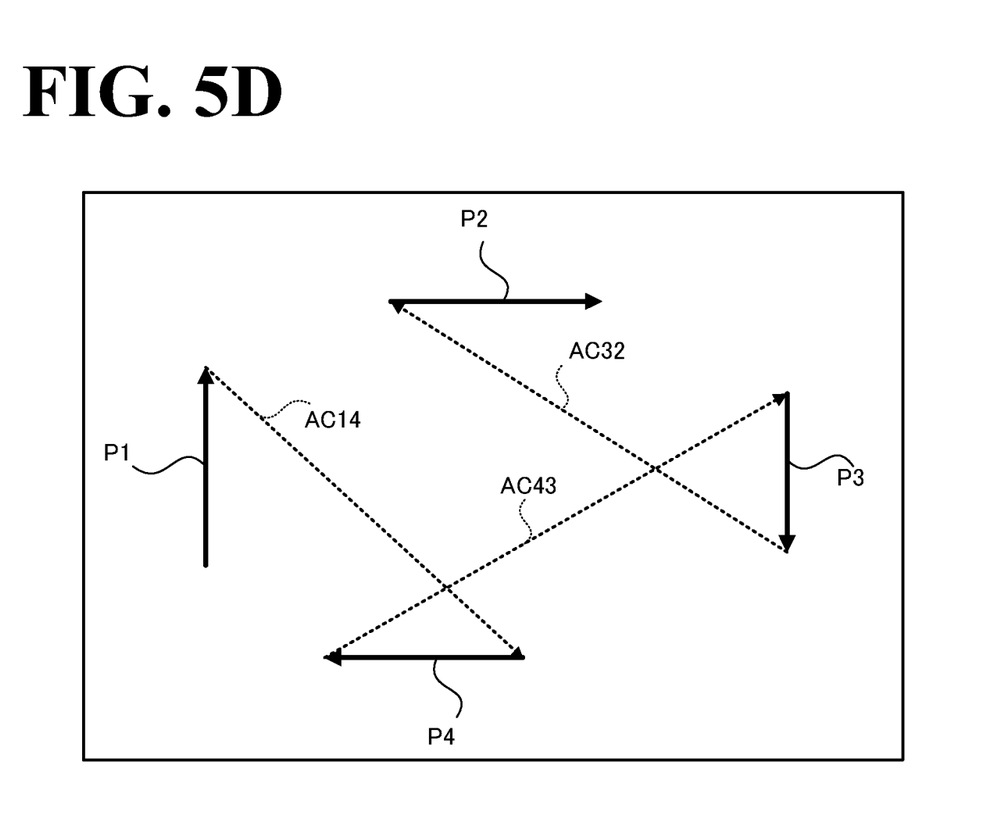
FIG. 5D is a fourth illustration of the processing of determining the transit order of the examination-use paths.

As illustrated in FIG. 5C, the determination part 11c calculates a period of time necessary for a movement through each of the candidate paths described above by referring to FIG. 5B. In the graph of FIG. 5C, the examination-use paths P arranged in columns indicate start points, and the examination-use paths P arranged in rows indicate end points.

Referring to FIG. 5C, assume that the period of time for movement from the end point of the examination-use path P1 to the start point of the examination-use path P2 is "0.3", the period of time for movement from the end point of the examination-use path P1 to the start-point of the examination-use path P3 is "1.0", and the period of time for movement from the end point of the examination-use path P1 to the start point of the examination-use path P4 is "0.1". In this case, the minimum period of time for movement is from the examination-use path P1 to the examination-use path P4.

Also assume that the period of time for movement from the end point of the examination-use path P2 to the start point of the examination-use path P1 is "0.4", the period of time for movement from the end point of the examination-use path P2 to the start point of the examination-use path P3 is "0.3", and the period of time for movement from the end point of the examination-use path P2 to the start point of the examination-use path P4 is "1.4". In this case, the minimum period of time for movement is from the examination-use path P2 to the examination-use path P3.

Also assume that the period of time for movement from the end point of the examination-use path P3 to the start point of the examination-use path P1 is "1.0", the period of time for movement from the end point of the examination-use path P3 to the start point of the examination-use path P2 is "0.1", and the period of time for movement from the end point of the examination-use path P3 to the start point of the examination-use path P4 is "1.2". In this case, the minimum period of time for movement is from the examination-use path P3 to the examination-use path P2.

Also assume that the period of time for movement from the end point of the examination-use path P4 to the start point of the examination-use path P1 is "0.4", the period of time for movement from the end point of the examination-use path P4 to the start point of the examination-use path P2 is "0.8", and the period of time for movement from the end point of the examination-use path P4 to the start point of the examination-use path P3 is "0.2". In this case, the minimum period of time for movement is from the examination-use path P4 to the examination-use path P3.

These results show that when the examination-use path P1 is the first path to take, the second path to take is the examination-use path P4, since the period of time for movement from the examination-use path P1 to the examination-use path P4 is shortest; the third path to take is the examination-use path P3, since the period of time for movement from the examination-use path P4 to the examination-use path P3 is shortest; and the last path to take is the examination-use path P2, since the period of time for movement from the examination-use path P3 to the examination-use path P2 is shortest. This ensures that all of the examination-use paths P are connected to each other in a shortest period of time.

It is to be noted that if any one of the examination-use paths P2 to P4 is used as the first path to take, the total period of time for movement becomes longer than the total period of time for movement in the case where the examination-use path P1 is used as the first path to take. In the case of FIG. 5C, therefore, the determination part 11c determines the transit order "P1→P4→P3→P2" as the order of the examination-use paths P through which the robot 20 passes.

Then, according to the determined order, the determination part 11c selects the candidate path AC14, which connects the end point of the examination-use path P1 to the start point of the examination-use path P4, and selects candidate path AC43, which connects the end point of the examination-use path P4 to the start point of the examination-use path P3. The determination part 11c also selects candidate path AC32, which connects the end point of the examination-use path P3 to the start point of the examination-use path P2.

Selecting candidate paths in this manner results in a "combined path" through which all of the examination-use paths P can be examined in a shortest period of time. Employing a shortest-time combined path ensures that the examination of the work regions WR on the workpiece W is more quickly completed.

While in FIGS. 5A to 5D the start point and the end point of each examination-use path P is determined in advance, the start point and the end point may not necessarily be determined in advance. That is, the start point and the end point of each examination-use path P may turn the other way round, and this possibility may be taken into consideration to calculate periods of time for movement through all possible combinations of paths. Then, a combined path that takes the shortest period of time among the calculated periods of time may be identified.

Figure 6:
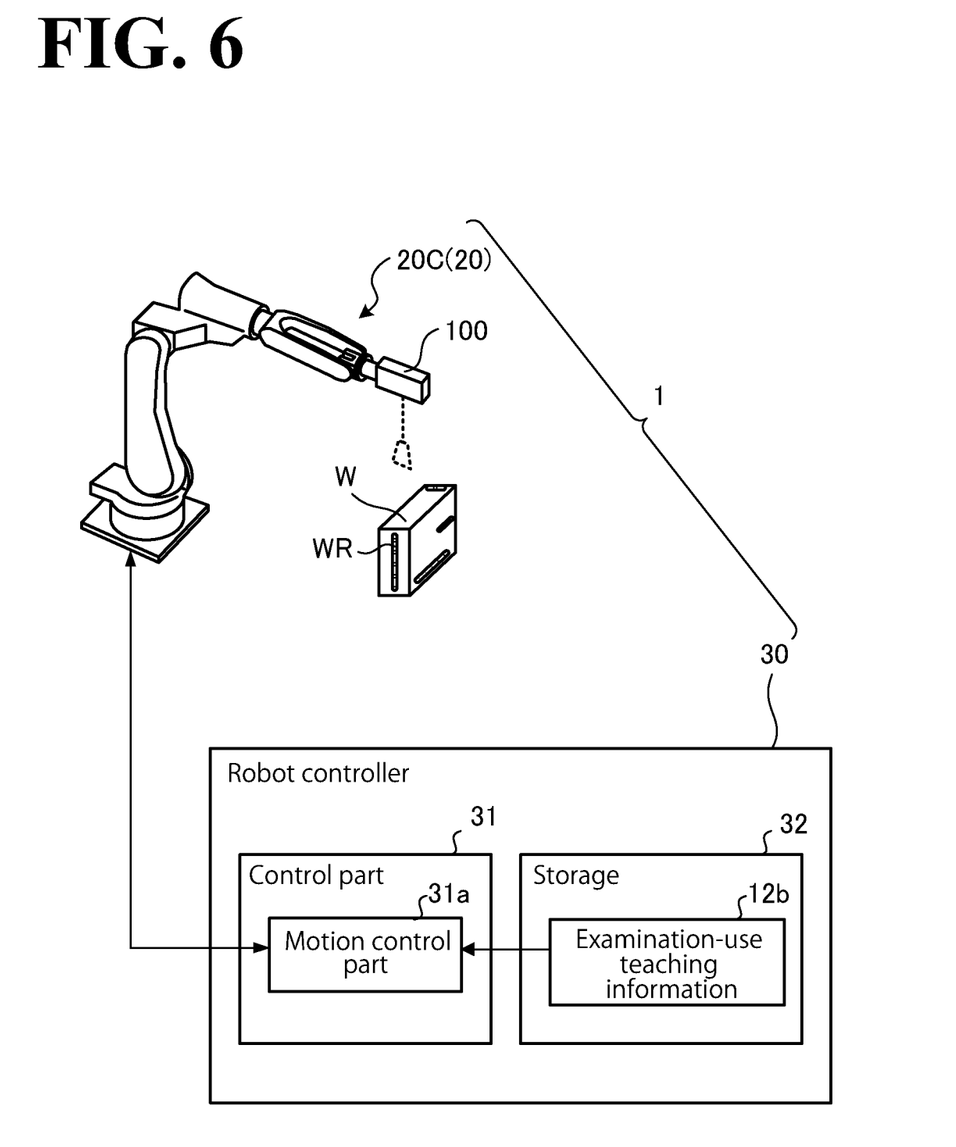
FIG. 6 illustrates a configuration of a robot system using a block diagram.

An example configuration of a robot system 1 will be described by referring to FIG. 6. FIG. 6 illustrates a configuration of the robot system 1 using a block diagram. The robot system 1 illustrated in FIG. 6 includes: the robot controller 30 that stores the first teaching information 12b generated by the teaching apparatus 10 illustrated in FIG. 4; and the examination robot 20C, which is controlled to make motions by the robot controller 30.

The examination robot 20C is attached with the examination device 100, and the robot system 1 operates the examination robot 20C to cause the examination device 100 to move and examine the work regions WR on the workpiece W.

A configuration of the examination robot 20C has already been described by referring to FIG. 3, and the workpiece W has already been described by referring to FIG. 1 and other drawings. In light of this, the following description is mainly regarding a configuration of the robot controller 30. As illustrated in FIG. 6, the robot controller 30 includes a control part 31 (for example, a control circuit) and a storage 32.

It is to be noted that the hardware configuration and the software configuration of the robot controller 30 may be similar to the hardware configuration and the software configuration of the teaching apparatus 10 illustrated in FIG. 4, and will not be elaborated upon here.

The control part 31 includes a motion control part 31a (for example, a motion control circuit). The motion control part 31a controls the examination robot 20C to make a motion based on the first teaching information 12b. Meanwhile, the motion control part 31a improves the motion accuracy of the robot 20 by for example, performing feedback control using values from the encoder of an actuator such as a motor or another motive power source of the examination robot 20C.

The storage 32 stores the first teaching information 12b. The first teaching information 12b is information generated by the teaching apparatus 10 illustrated in FIG. 4. Details of the first teaching information 12b have already been described above and will not be elaborated further upon here.

Thus, based on the first teaching information 12b generated by the teaching apparatus 10, the robot system 1 causes the robot controller 30 to perform motion control of the examination robot 200. That is, the robot system 1 eliminates the need for the work of teaching the examination robot 20C, increasing the efficiency of examination of the workpiece W.

Figure 7:
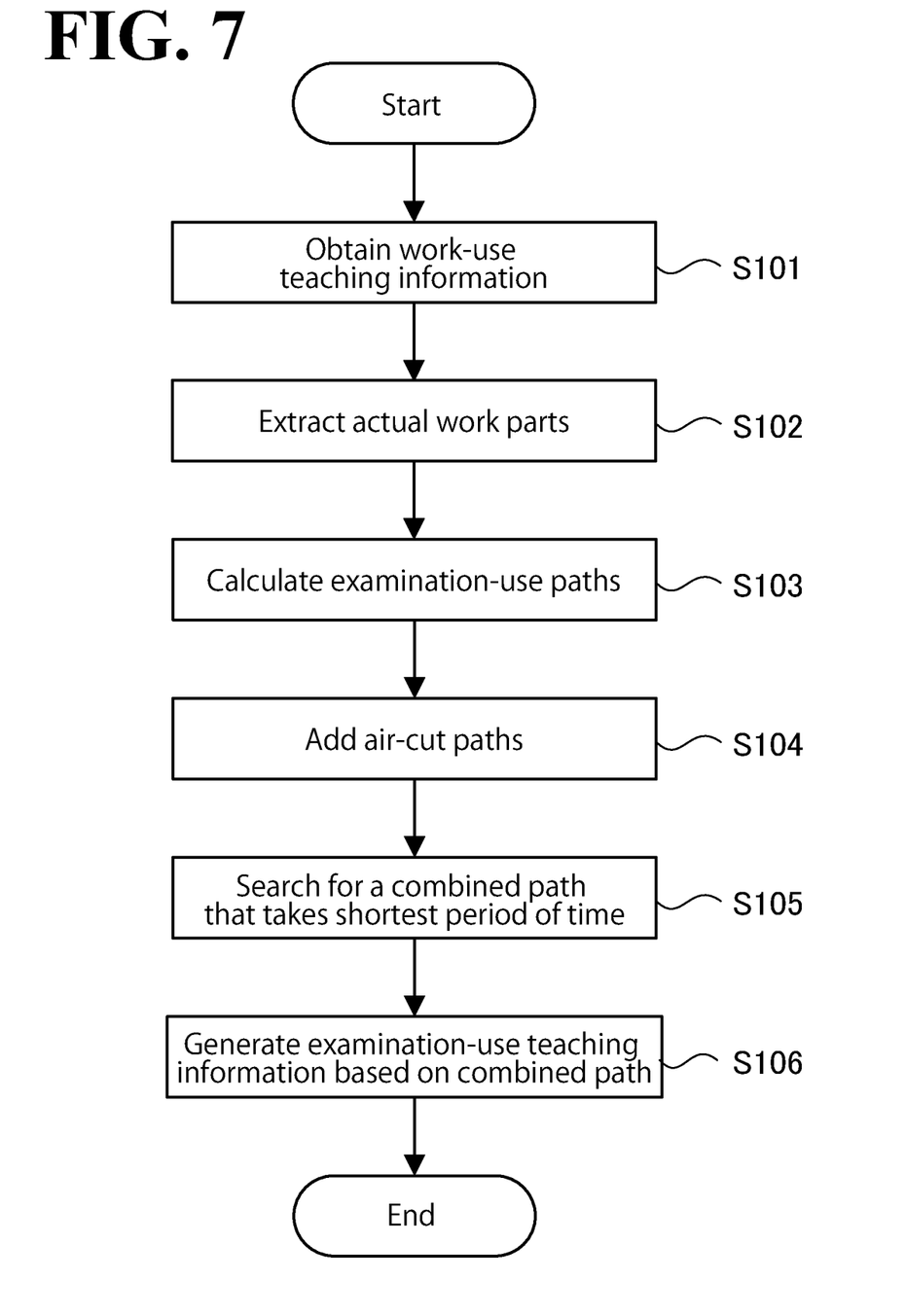
FIG. 7 is a flowchart of a procedure for processing performed by the teaching apparatus.

By referring to FIG. 7, description will be made with regard to a procedure for processing performed by the teaching apparatus 10 illustrated in FIG. 4. FIG. 7 is a flowchart of a procedure for processing performed by the teaching apparatus 10. In the following description referring to FIG. 7, second teaching information is obtained as result information.

As illustrated in FIG. 7, the obtaining part 11a of the teaching apparatus 10 obtains second teaching information (step S101). Next, the calculation part 11b extracts actual work parts from the obtained second teaching information (step S102). For example, the calculation part 11b may extract actual work parts in the following manner. An instruction to operate or stop the work tool 200 is included in the second teaching information, and from the instruction, the calculation part 11b may extract paths corresponding to the sections in which the work tool 200 operates.

Then, the calculation part 11b calculates examination-use paths corresponding to the actual work parts extracted from the second teaching information (step S103). In calculating examination-use paths, the calculation part 11b takes into consideration the difference in size between the work tool 200 of the work robot 20W and the examination device 100 of the examination robot 20C.

Next, the determination part 11c adds air-cut paths to the examination-use paths (step S104). Then, based on the determination condition 12a, the determination part 11c searches for a combined path that takes the shortest period of time (step S105). Then, based on the determined combined path, that is, based on the shortest-time combined path, the determination part 11c generates the first teaching information 12b (step S106), and the entire processing ends.

The generated first teaching alternation 12b is output by the outputting part 11e to the robot controller 30 illustrated in FIG. 6. Then, the robot controller 30 performs motion control of the examination robot 20C.

Figure 8:
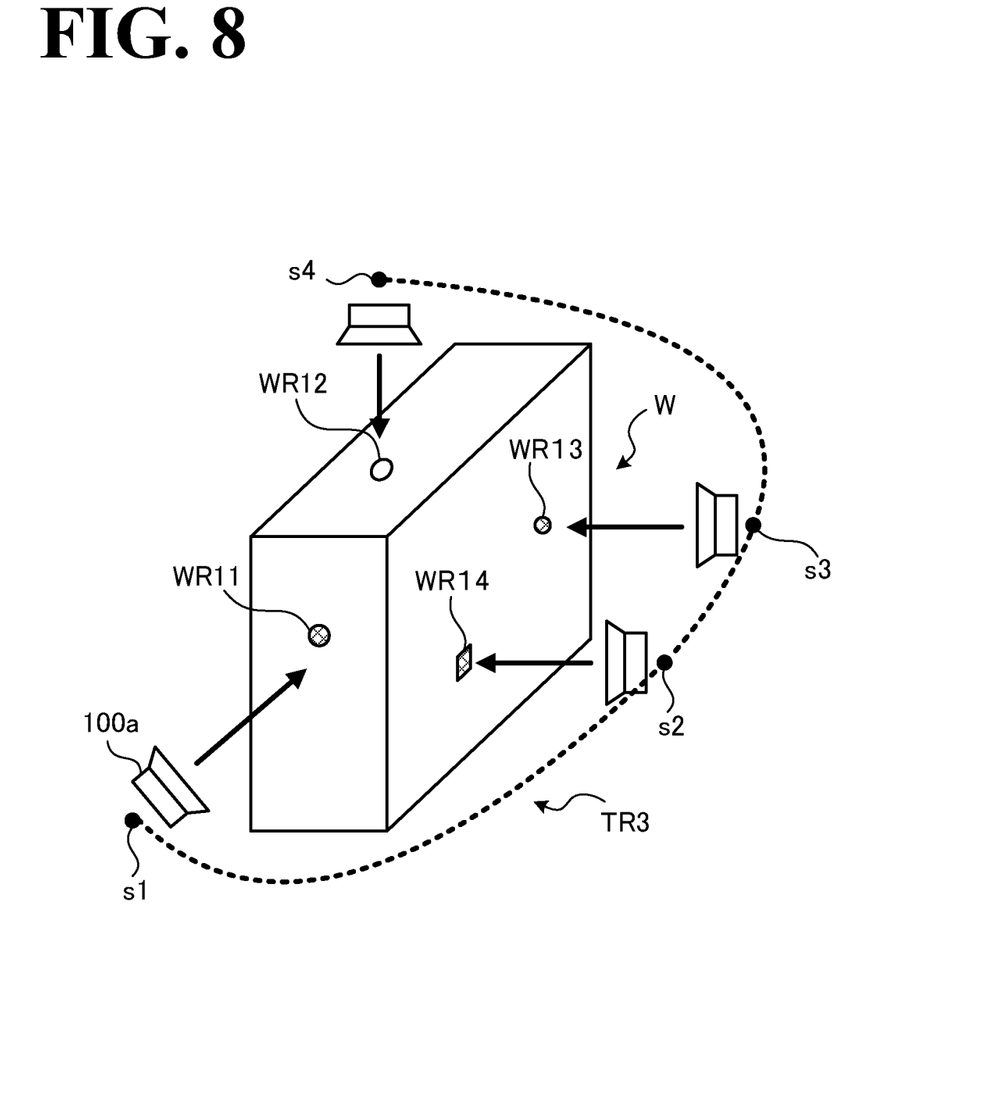
FIG. 8 illustrates a modification of the embodiment.

The above-described work region WR has been described as a welding trace that has extension direction, and such work region WR has been subjected to an examination. This configuration, however, is not intended in a limiting sense; the work region WR may be a flat region such as a sealing and a screw hole. By referring to FIG. 8, description will be made with regard to a case where a flat region is examined. FIG. 8 illustrates a modification of the above-described embodiment.

As illustrated in FIG. 8, there are work regions WR11 to WR14 on the workpiece W. Each of the work regions WR11 to WR14 is a flat work region WR such as a sealing and a screw hole. While in FIG. 8 each of the work regions WR11 to WR14 has an area, each of the work regions WR11 to WR14 may not necessarily have an area, in which case each work region WR may be a center point of a sealing or a screw hole. The examination device 100 used in this modification is an examination device 100a that includes a camera that picks up an image of a two-dimensional region.

Thus, an examination device 100a that includes a camera is used to examine the work regions WR11 to WR14. This is because the examination device 100 need not make a movement while examining the work regions WR11 to WR14, unlike the above-described embodiment, where the examination device 100 needs to move in the extension direction of a welding trace. That is, in the examination of the work regions WR11 to WR14, the examination device 100a may be kept in stationary state. Examples of specifics to be examined include, but are not limited to: whether the sealing is at a correct position in a predetermined orientation; and whether a screw is correctly tightened in the screw hole.

The obtaining part 11a obtains, as result information, shape information regarding a three-dimensional shape of the workpiece W including the work regions WR11 to WR14. The determination part 11c determines a motion path TR3. The motion path TR3 includes work point s1, work point s2, work point s3, and work point s4. The work points s1 to s4 respectively correspond to the work regions WR. Based on the motion path TR3, the generation part 11d generates first teaching information 12b, which specifies motions of the examination robot 20C.

The examination robot 20C moves along the motion path TR3. Specifically, the examination device 100a may pick up an image of the work points s1 to s4 with the examination robot 20C stopping at each point. Alternatively, the examination device 100a may pick up an image of each point with the examination device 100a kept moving. While the examination device 100a is picking up an image of each point, it is possible to lower the speed of movement of the examination robot 20C.

As has been described hereinbefore, the teaching apparatus 10 according to this embodiment includes the obtaining part 11a and the generation part 11d. The obtaining part 11a obtains result information corresponding to the position of a worked region on the workpiece W. Based on the obtained result information 11a, the generation part 11d generates first teaching information 12b. The first teaching information 12b specifies motions of the examination robot 20C, which examines the workpiece W that has undergone work.

Thus, the teaching apparatus 10 generates the first teaching information 12b based on result information corresponding to the position of a worked region on the workpiece W. This ensures that teaching information for the examination robot 20C is automatically generated.

The robot system 1 according to this embodiment also includes the examination robot 20C and the robot controller 30. The examination robot 20C examines the workpiece W that has undergone the work. The robot controller 30 controls motions of the examination robot 20C based on the first teaching information 12b generated by the teaching apparatus 10.

Thus, the robot system 1 controls motions of the examination robot 20C based on the first teaching information 12b generated by the teaching apparatus 10. This ensures that teaching information for the examination robot 20C is automatically generated.

The teaching method according to this embodiment includes an obtaining step and a generating step. The obtaining step includes obtaining result information corresponding to the position of a worked region on the workpiece W. The generating step includes generating first teaching information 12b based on the result information obtained in the obtaining step. The first teaching information specifies motions of the examination robot 20C, which examines the workpiece W that has undergone work.

Thus, the teaching method includes generating the first teaching information 12b based on the result information obtained in the obtaining step. The first teaching information 12b specifies motions of the examination robot 20C, which examines the workpiece W that has undergone work. This ensures that teaching information for the examination robot 20C is automatically generated.

While in the above-described embodiment the work regions WR are located on the outer surfaces of the workpiece W, the teaching apparatus 10, the robot system 1, and the teaching method according to this embodiment are also applicable to cases where the work regions WR are located on the inner surfaces of the workpiece W.

While in the above-described embodiment circuitry is used to perform the functions of the parts 11a to 11e, this configuration is not intended in a limiting sense; it is also possible to use a plurality of circuits to perform the respective functions of the parts 11a to 11e.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by letters patent of the United States is:

1. A teaching apparatus comprising:
   circuitry configured to:
   obtain result information regarding a worked region on a workpiece;
   the result information indicating a work path used to perform work by a first work robot on the worked region of the workpiece;
   generate first teaching information based on the result information, the first teaching information specifying a motion of a first examination robot configured to examine the workpiece that has undergone work performed on it;
   wherein the result information comprises work path information and operating information where the work path information indicates a motion path of the first work robot and the operating information indicates where a work tool of the first work robot was in an operating state and in a non-operating state along the work path;
   calculate a plurality of examination-use paths based on the work path information and the operating information of the result information, for the first examination robot; and determine a transit order in which the plurality of examination-use paths are taken for the first examination robot, and wherein the first teaching information generated by the circuitry indicates that the examination-use paths are connected to each other according to the transit order for the first examination robot;

wherein the determined transit order being an order through which all of the examination-use paths are taken in a shortest possible period of time; and wherein the work path performed by the first work robot and the determined transit order performed by the first examination robot is different.

2. The teaching apparatus according to claim 1, wherein the circuitry is configured to obtain, as the result information, three-dimensional shape information of the workpiece, the shape information including region information indicating a work region on the workpiece.

3. The teaching apparatus according to claim 2, wherein the circuitry is configured to generate the first teaching information based on a shape of an examination device attachable to the first examination robot so that the first teaching information prevents an interference between the examination device and the workpiece or between the examination device and an obstacle.

4. The teaching apparatus according to claim 1, wherein the circuitry is configured to generate the first teaching information based on a shape of an examination device attachable to the first examination robot, so that the first teaching information prevents an interference between the examination device and the workpiece or between the examination device and an obstacle.

5. The teaching apparatus according to claim 4, wherein the circuitry is configured to generate the first teaching information based on an examinable range in which the examination device is able to examine the workpiece.

6. The teaching apparatus according to claim 1, wherein the circuitry is configured to generate the first teaching information based on a shape of an examination device attachable to the first examination robot so that the first teaching information prevents an interference between the examination device and the workpiece or between the examination device and an obstacle.

7. The teaching apparatus according to claim 1, wherein the circuitry is configured to generate the first teaching information based on a shape of an examination device attachable to the first examination robot so that the first teaching information prevents an interference between the examination device and the workpiece or between the examination device and an obstacle.

8. The teaching apparatus according to claim 1, wherein the circuitry is configured to generate the first teaching information based on a shape of an examination device attachable to the first examination robot such that an interference between the examination device and the workpiece or between the examination device and an obstacle is avoided.

9. The teaching apparatus according to claim 1 wherein the circuitry is configured to calculate a plurality of different examination-use paths which use different candidate paths based on the result information.

10. The teaching apparatus according to claim 1, wherein the circuitry is configured to calculate a plurality of different candidate paths and a time it takes to complete each candidate path, each candidate path connecting an end of a first examination-use path to a beginning of a second examination-use path.

11. The teaching apparatus according to claim 1, wherein the first work robot and the first examination robot are different robots.

12. A robot system comprising:
a first examination robot configured to examine a workpiece that has undergone work;
a first work robot configured to perform work on the workpiece; and
circuitry configured to:
obtain result information regarding a first position of a worked region on a workpiece;
the result information indicating a work path used to perform work by the first work robot on the workpiece;
wherein the result information comprises work path information and operating information where the work path information indicates a motion path of the first work robot and the operating information indicates where a work tool of the first work robot was in an operating state and in a non-operating state along the work path;
and
generate first teaching information based on the result information, the first teaching information specifying a motion of the first examination robot configured to examine the workpiece that has undergone work performed on it,
a robot controller configured to control a motion of the first examination robot based on the first teaching information;
calculate a plurality of examination-use paths based on the work path information and the operating information of the result information, for the first examination robot; and
determine a transit order in which the plurality of examination-use paths are taken for the first examination robot, and
wherein the first teaching information generated by the circuitry indicates that the examination-use paths are connected to each other according to the transit order for the first examination robot,
wherein the determined transit order being an order through which all of the examination-use paths are taken and an operation load of the first examination robot is minimized;
wherein the work path performed by the first work robot and the determined transit order performed by the first examination robot is different.

13. The robot system according to claim 12, wherein the circuitry is configured to calculate a plurality of different candidate paths and a time it takes to complete each candidate path, each candidate path connecting an end of a first examination-use path to a beginning of a second examination-use path.

14. A teaching method comprising:
obtaining result information, using circuitry, regarding a position of a worked region on a workpiece;
the result information indicating a work path used to perform work by a first work robot on the workpiece
generating, using the circuitry, first teaching information specifying a motion of a first examination robot configured to examine the workpiece that has undergone work, wherein the first teaching information is generated based on the result information obtained in the obtaining step;
wherein the result information comprises work path information and operating information where the work path information indicates a motion path of the first work robot and the operating information indicates where a work tool of the first work robot was in an operating state and in a non-operating state along the work path;

calculating a plurality of examination-use paths based on the work path information and the operating information of the result information, for the first examination robot;

determining a transit order in which the plurality of examination-use paths are taken for the first examination robot, and wherein the first teaching information indicates that the examination-use paths are connected to each other according to the transit order for the first examination robot, wherein the determined transit order being an order through which all of the examination-use paths are taken and a torque load on a driving source of the first examination robot is minimized;

wherein the work path performed by the first work robot and the determined transit order performed by the first examination robot is different.

15. The teaching method according to claim 14, wherein the circuitry calculates a plurality of different candidate paths and a time it takes to complete each candidate path, each candidate path connecting an end of a first examination-use path to a beginning of a second examination-use path.

* * * * *